United States Patent
Burg

(10) Patent No.: US 6,604,484 B2
(45) Date of Patent: Aug. 12, 2003

(54) SHIP SUPPORTED BY SUBMERGED STRUCTURE

(76) Inventor: Donald E. Burg, 15840 SW. 84th Ave., Miami, FL (US) 33157

( * ) Notice: Subject to any disclaimer, the term of this patent is extended or adjusted under 35 U.S.C. 154(b) by 0 days.

(21) Appl. No.: 09/977,650

(22) Filed: Oct. 15, 2001

(65) Prior Publication Data

US 2003/0070602 A1 Apr. 17, 2003

(51) Int. Cl.[7] .................................................. B63B 1/24
(52) U.S. Cl. ........................ 114/274; 114/280; 114/289; 114/67 R
(58) Field of Search .............................. 114/67 R, 67 A, 114/271, 274, 280, 283, 288, 289, 290, 292

(56) References Cited

U.S. PATENT DOCUMENTS

| | | | | |
|---|---|---|---|---|
| 5,415,120 A | * | 5/1995 | Burg | 114/289 |
| 5,967,071 A | * | 10/1999 | Wipper | 114/67 A |
| 6,145,459 A | * | 11/2000 | Takahashi et al. | 114/67 A |

* cited by examiner

Primary Examiner—Stephen Avila
(74) Attorney, Agent, or Firm—Robert J. Van Der Wall

(57) ABSTRACT

A high efficiency extremely stable marine vehicle that is connected to and supported by submerged supporting structure(s) is presented. The submerged structure(s) are normally airfoil shaped to insure maximum efficiency and are, in the preferred embodiments, air lubricated on their undersides by pressurized air to reduce wetted area frictional effects. Propulsor(s) take in water from the boundary layer adjacent the upper surfaces of the submerged supporting structure(s) which provides boundary layer control and also enhances the efficiency of the propulsor(s).

50 Claims, 4 Drawing Sheets

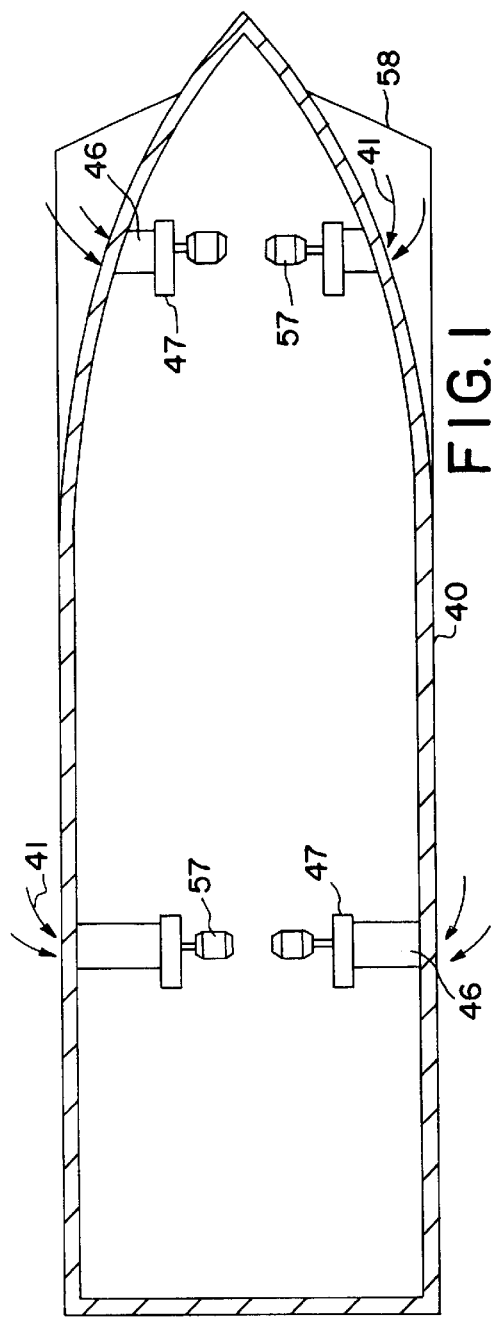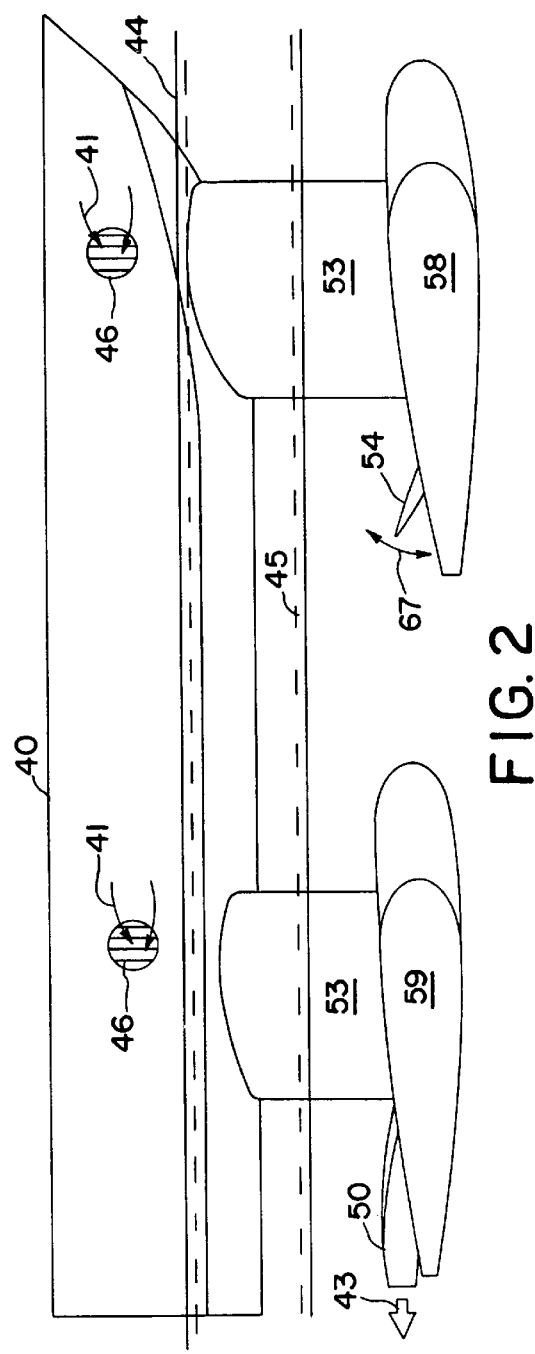

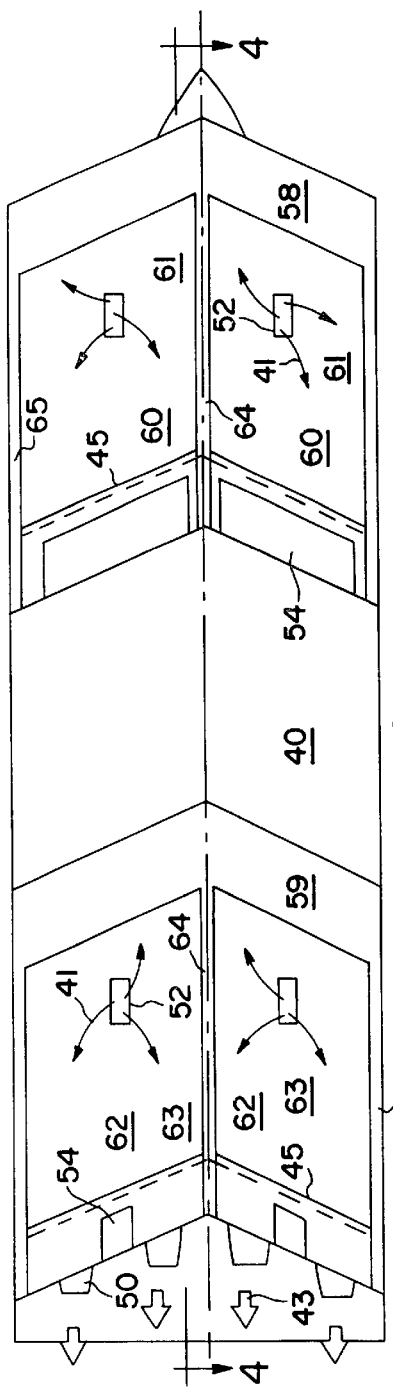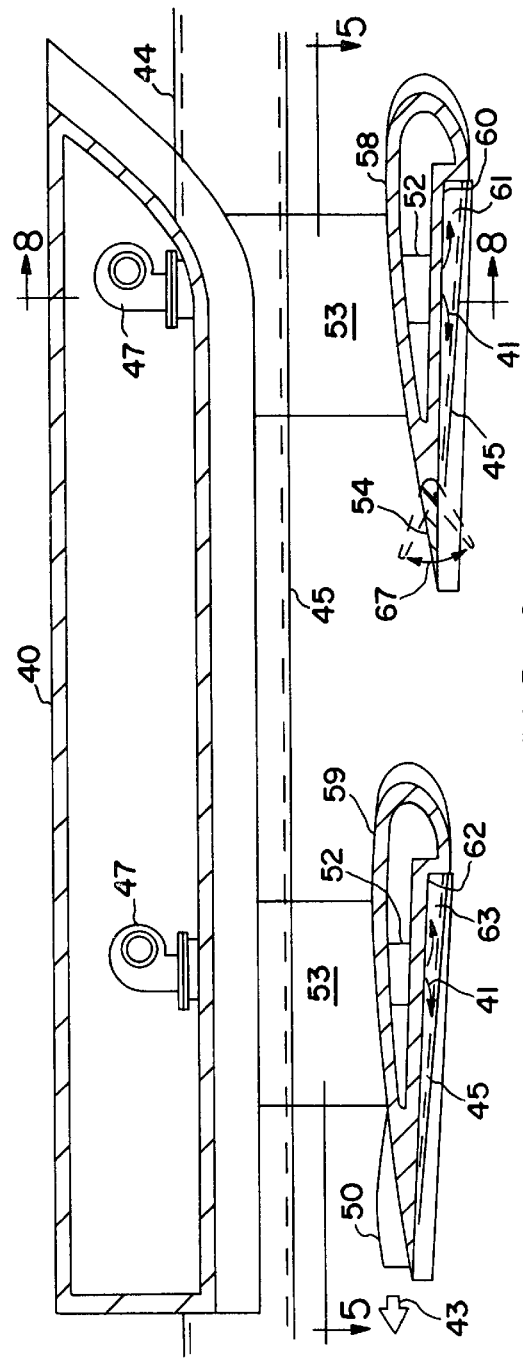

SHIP SUPPORTED BY SUBMERGED STRUCTURE

FIELD OF THE INVENTION

This invention relates to the field of marine vehicles or ships that are at least partially supported by submerged structures that are sometimes known as lifting bodies. These submerged structures may take any of a number of forms with a hydrofoil shape preferred. The submerged structure(s) is normally connected to an above water hull portion of the ship by a strut-like member(s). This invention also extends into the fields of air lubricated boat hulls and boundary layer control means to improve hull and/or propulsor efficiencies.

BACKGROUND OF THE INVENTION

Applicant has pursued Surface Effect Ship (SES) technology for a number of years as is evidenced by numerous United States patents. A typical example is Burg, U.S. Pat. No. 5,860,380. It is important to note that the SES rides on the top of the water when moving forward at cruise or high speeds while the instant invention does not. For purposes of this application, high speed is defined as speeds of 15 knots or more. The prior art is exemplified as being a surface skimming SES design by noting the static waterline and the high speed dynamic waterline, A and C respectively, in that Burg patent. Contrarily, the supporting structure is, at least in its majority, submerged during both static and high speed operation in the instant invention's case.

Air lubrication, with the air supplied by artificial pressurization means, is employed in the preferred embodiment of the instant invention to reduce wetted area of the underside of the submerged structure(s). It is important to note that a portion of the submerged structure(s) forward of the air injection is rather deep in the water to thereby dig a deep hole in the water forward of the air layer. This is therefore classed as a true air lubrication system and not a SES.

In its preferred embodiment where the submerged structure(s) is hydrofoil shaped, at least on its upper surfaces, added lift is possible by controlling the boundary layer. This is done by taking in water for the propulsor(s) from the upper surfaces of the submerged structure(s) at selected location(s). An added benefit of taking in this boundary layer is that the propulsor are rendered more efficient due to the added momentum change to the water imparted by the propulsors. Yet another benefit is that the propulsors are not subject to taking in aerated water since they are operating distal from the air layer(s).

The instant invention offers advancements over applicant's earlier inventions as well as over the prior art. These advancements are discussed in detail in the following sections.

SUMMARY OF THE INVENTION

The object of the instant invention is to offer the tremendous stability of a marine vehicle hull connected to a first submerged structure by way of one or more connecting structural member(s) but with higher efficiencies than are normally associated with such designs.

It is a directly related object of the invention that the first submerged structure be, at least in its majority, submerged during high-speed operation of the marine vehicle.

It is a related object of the preferred embodiment of the invention that the connecting structural member(s) be strut-like in shape.

A related object of the invention is that such connecting structural members, in their preferred embodiment, be at least in part airfoil shaped.

It yet another object of the invention that there be means to supply pressurized gas from artificial gas pressurization means to an underside of said first submerged supporting structure to thereby form a friction reducing gas layer.

A directly related object of the invention is that the gas layer, on average, rises going from forward to aft.

A further related object of the invention that the gas layer be formed, at least in its majority, aft of a discontinuity in a lower surface of the first submerged supporting structure.

Yet another object of the invention is that port and starboard portions of said gas layer can be, at least in their majority, separated by structure.

It is a directly related object of the invention that the structure separating port and starboard portions of the gas layer be as a keel proximal the centerline of the marine vehicle.

Another related object of the invention is that the gas layer be restrained by a sidekeel of said first submerged supporting structure.

Another object of the invention is that the first submerged supporting structure be, at least in part, airfoil shaped.

It is a related object of the invention that a forward outermost portion of the first submerged supporting structure be aft of a forward portion proximal the horizontal centerline of the submerged supporting structure.

It is a further related object of the invention that a submerged supporting structure be comprised of port and starboard airfoil shapes that converge going inward toward each other.

Yet another object of the invention is that there be a propulsor that takes in water from a location proximal an upper surface of a submerged supporting structure.

A directly related object of the invention is that, during high speed forward operation in calm seas, at least twenty percent of the water taken into the propulsor be from a boundary layer adjacent a submerged supporting structure.

Another directly related object of the invention is that, during high speed forward operation in calm seas, at least thirty percent of the water taken into the propulsor be from a boundary layer adjacent a submerged supporting structure.

Yet another directly related object of the invention is that, during high speed forward operation in calm seas, at least forty percent of the water taken into the propulsor be from a boundary layer adjacent a submerged supporting structure.

Still another directly related object of the invention is that, during high speed forward operation in calm seas, at least fifty percent of the water taken into the propulsor be from a boundary layer adjacent a submerged supporting structure.

A further object of the invention is that a control surface be disposed proximal a submerged supporting structure.

A directly related object of the invention is that the control surface be a flap like member.

Another object of the invention is that is may include a second submerged supporting structure.

A related object of the invention is that one of the supporting structures can be, on average, higher than the other.

It is a directly related object of the invention that the aft supporting structure be higher than the forward supporting structure.

Another object of the invention is that at least one of the connecting structural members be, at least in part, airfoil shaped.

Yet another object of the invention is that a connecting structural member include a pressurized gas passageway that is in gaseous communication with the artificial gas pressurization means and the gas layer.

BRIEF DESCRIPTION OF THE DRAWINGS

FIG. 1 presents a top plan view of the preferred embodiment of the instant invention with the deck removed so that gas pressurizing blowers are shown.

FIG. 2 is a profile view that shows calm sea static and dynamic waterlines. Note that the dynamic waterline is the lower waterline. Its location shows that the submerged supporting structures well submerged during high-speed forward operation.

FIG. 3 shows a bottom plan view of the instant invention. Note the pressurized gas inlets. The gas layers terminate aft where the waterline marks are shown on the underside of the submerged supporting structures.

FIG. 4 is sectional view, as taken through line 4—4 of FIG. 3, that shows gas layers under each submerged supporting structure.

DETAIL DESCRIPTION

Figure 5:
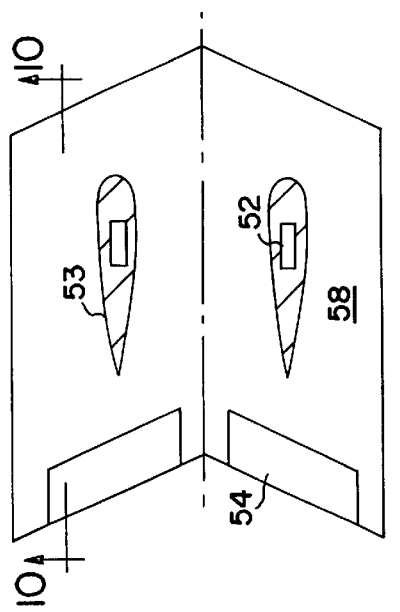
FIG. 5 presents a cross-sectional view, as taken through line 5—5 of FIG. 4, that shows the top sides of the submerged supporting structures. It also shows the preferred airfoil shaped connecting structures that, in this instance, include gas passageways.

FIG. 1 is a topside plan view of the instant invention called S4 (Ship Supported by Stabilized Structure) 40, high pressure blowers 47, air inlets 46, motors 57, air flow arrows 41, and a first, in this case forward, submerged supporting structure 58.

FIG. 2 presents a profile view of the S4 40 showing forward and aft submerged supporting structures 58, 59. These may be referred to as the first and the second submerged supporting structure with no distinction as to which is the forward and which the aft in the claims and other writings of this application. Also shown are the connecting structures 53, propulsor 50, propulsor thrust indicating arrow 43, trimming device 54 which in this case is a flap-like member, trimming device rotation arrow 67, and air inlets 46. Note the preferred embodiment calm sea static waterline 44 and the calm seal high-speed waterline 45. These waterlines, after accounting for wave action, make for a superb rough water high speed vessel since the waterplane areas of the connecting structures are small and little effected by wave action.

FIG. 3 is a bottom plan view of the instant invention S4 40. Note the preferred angled aft from center shape of the submerged supporting structures 58, 59. It is best to angle the leading edges of those structures aft going outward from proximal their centers to make for self cleaning designs. The reason for making the entire structure angle aft going from center to outboard is mainly for simplicity of construction. When manufacturing from metal, such as aluminum, or sheets of composites it is simplest to form the preferred airfoil shapes and then join them at centerline or thereabouts. Other shapes such as full or partial oblong or circular are also possible and may in some instances offer performance and or structural advantages. All manner of shape of the submerged supporting structures 58, 59 are considered within the spirit and scope of the instant invention.

FIG. 3 further shows the gas layer recesses 60, 62 and the gas layers 61, 63. Pressurized gas is supplied to the gas layers through gas discharge openings 52. Gas layer restraining sidekeels 65 and a gas layer separating structure 64 are also shown. There is some advantage to having separated port and starboard gas layers when operating in beam seas or crosswinds since such separation would add stability to the vessel in roll. The dynamic waterlines 45 shown indicate about where the gas layers terminate going aft during calm sea operations. The effect of this reduction in wetted area is substantial and calculations show that efficiency gains of 20 percent due to the reduction in wetted area friction are possible.

FIG. 4 presents a cross-sectional view, as taken through line 4—4 of FIG. 3, that shows internal workings of two submerged supporting structures 58, 59. Note the generally airfoil shapes over their top surfaces. That shape accelerates water flowing over their upper surfaces which results in a lowering of the static pressure and increased lift—basic airfoil or hydrofoil theory. What is unusual is the use of air lubrication on their undersides. That is shown by dynamic waterlines 45. Note that the dynamic waterlines 45 are rising as is the preferred way to design these craft since that approach results in very low blower power requirements. Going to increased pressures so that the water levels are depressed is also possible; however, that approach requires much greater blower power.

FIG. 5 is a top plan cross-sectional view, as taken through line 5—5 of FIG. 4, that shows the upper side of the preferred arrangements of the submerged supporting structures 58, 59. Note particularly the propulsor 50 water inlets 51 and the water flow arrows 42. These are preferably transversely oriented so that take in as much as the boundary layer over the width of the top surfaces of submerged supporting structures 58, 59 as possible. The preferred airfoil shapes of the connecting structures 53 and their internal pressurized gas flow passageways 52 are also shown.

Figure 6:
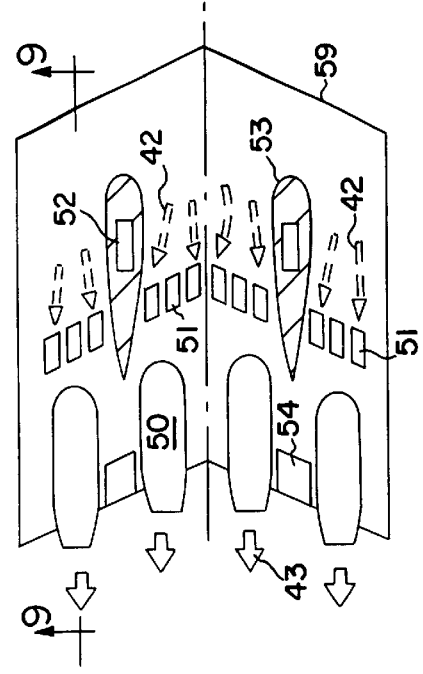
FIG. 6 presents a bow view of the instant invention.

FIG. 6 presents a bow view of the S4 40. Note that the forward submerged supporting structure 58 is, on average, lower than the aft submerged supporting structure 59 here. This offers advantage in that the overall efficiency of the S4 40 is enhanced since the aft supporting structure 59, by being elevated, is receiving additional lift from the trailing vortexes of the forward supporting structure 58.

Figure 7:
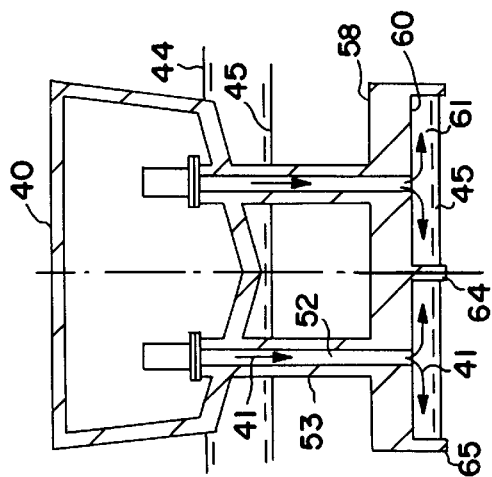
FIG. 7 is a stern view of the instant invention. Note the four waterjet propulsor discharges on the aft submerged supporting structure. Also shown are the forward submerged supporting structure's and the aft supporting structure's gas layers. These gas layers act to form insulating layers between the structures and the water to thereby reduced wetted area friction. This effect can also be called air lubrication.

FIG. 7 is a stern view of the instant invention S4 40. Note the four propulsors 50 which in this care are waterjet propulsors. Other propulsors such as exposed propellers may also be employed but waterjets offer advantage do to their ability to offer good boundary layer control means.

Figure 8:
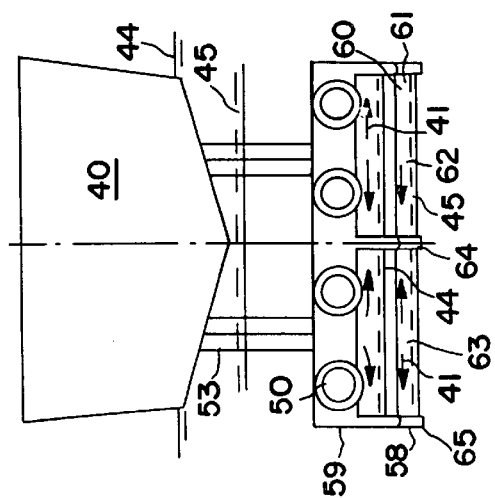
FIG. 8 is a cross-sectional view, as taken though line 8—8 of FIG. 4, that shows a transverse cross section in way of the connecting structure.

FIG. 8 gives a cross-sectional view, as taken through line 8—8 of FIG. 4, that illustrates a typical transverse cross section in way of the connecting structures 53. Shown are the gas passageways 52, gas layer recess 60, gas layer 61, port and starboard dividing structure 64, sidekeels 65, and gas flow arrows 41.

Figure 9:
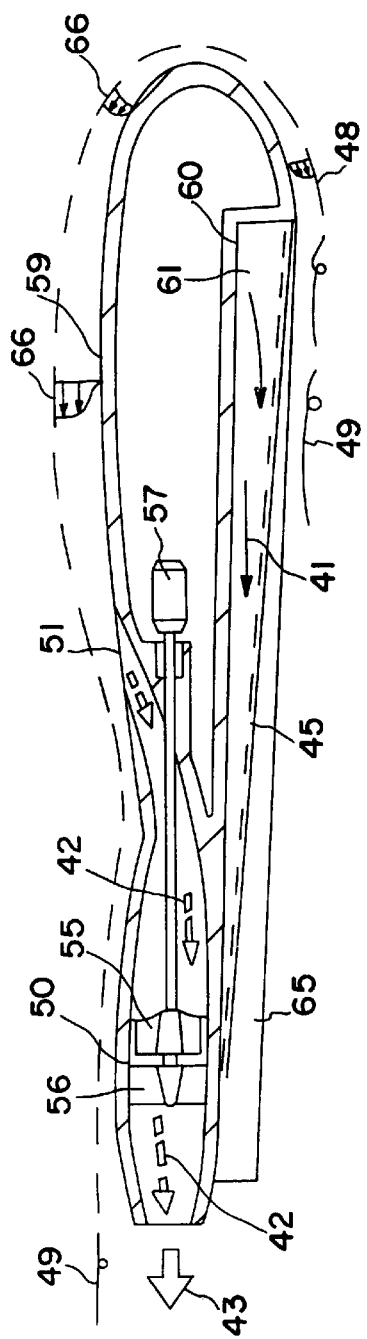
FIG. 9 presents a cross-sectional view, as taken through line 9—9 of FIG. 5, that shows workings of the preferred waterjet propulsor. The boundary layer is shown by the dashed line surrounding the top surface. Note that much of the boundary layer forward to and proximal the propulsor inlet is absorbed by the propulsor. This absorption of the boundary layer results in greatly enhanced propulsor efficiency and also gives boundary layer control to the airfoil shaped submerged supporting structure and hence enhances efficiency of that airfoil shape also.

FIG. 9 presents a cross-sectional view, as taken through line 9—9 of FIG. 5, that importantly shows the boundary layer lines 48, boundary layer velocity profiles 66, and turbulent flow lines 49 around the submerged supporting structure 59. It is easy to realize how boundary layer control can be realized by taking the boundary layer into the propulsor inlets 51. In this instance where the propulsor 50 is a waterjet, that waterjets impeller 55 and stator vanes 56 are shown.

Figure 10:
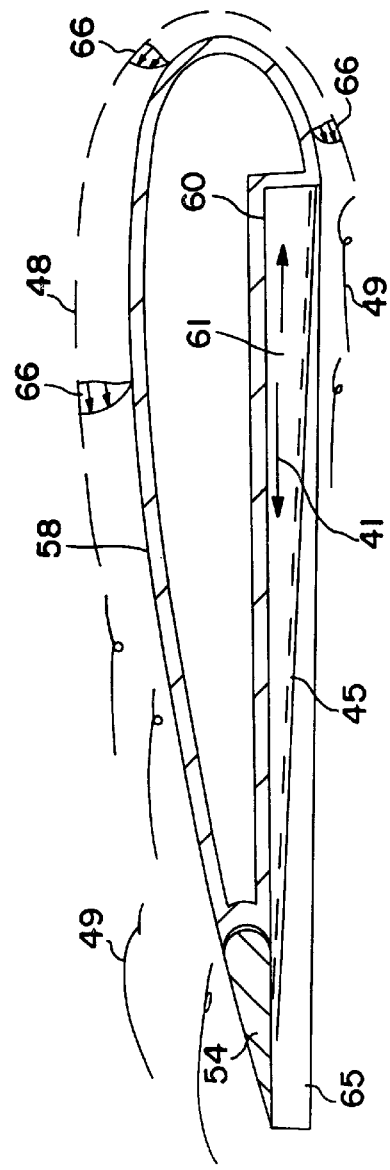
FIG. 10 is a cross-sectional view, as taken through line 10—10 of FIG. 5, showing a typical cross section in way of a pressurized air layer. Note that the gas layer, on average, rises going from forward to aft. While the gas layer can be made to depress the water surface rather than allow it to rise, the preferred approach is to let it rise slightly going from forward to aft as that requires less blower power.

FIG. 10 is a cross-sectional view, as taken through line 10—10 of FIG. 5, that indicates flow over the upper surface of submerged supporting structure 58. Note that the flow separation lines start further forward here compared to in FIG. 9 since there is no propulsor water inlet providing boundary layer control. It is quite possible and actually preferred to employ propulsor(s) in the forward submerged supporting structure also to thereby enhance lift of the submerged supporting structure 58.

While the invention has been described in connection with a preferred and several alternative embodiments, it will be understood that there is no intention to thereby limit the invention. On the contrary, there is intended to be covered all alternatives, modifications and equivalents as may be included within the spirit and scope of the invention as defined by the appended claims, which are the sole definition of the invention.

What I claim is:

1. In an improved marine vehicle that has a hull member that is at least partially supported by a first submerged supporting structure, the improvement comprising:
   one or more connecting strut members in mechanical communication with the hull member and the first submerged supporting structure, said first submerged supporting structure at least in its majority submerged during high speed forward operation of the improved marine vehicle, and means to supply gas from an artificial gas pressurization means to an underside of said first submerged supporting structure to thereby form a gas layer and wherein the first submerged supporting structure is, at least in part, airfoil shaped.

2. The improved marine vehicle of claim 1 wherein said gas layer, on average, rises going from forward to aft.

3. The improved marine vehicle of claim 1 wherein said gas layer is formed, at least in its majority, aft of a discontinuity in a lower surface of the first submerged supporting structure.

4. The improved marine vehicle of claim 1 wherein port and starboard portions of said gas layer are, at least in their majority, separated by structure.

5. The improved marine vehicle of claim 1 wherein said gas layer is restrained by a sidekeel of said first submerged supporting structure.

6. The improved marine vehicle of claim 1 which further comprises a second submerged supporting structure.

7. The improved marine vehicle of claim 1 wherein a forward outermost portion of said first submerged supporting structure is aft of a forward portion proximal the horizontal centerline of said submerged supporting structure.

8. The improved marine vehicle of claim 1 wherein the first submerged supporting structure is comprised of port and starboard airfoil shapes that converge going inward toward each other.

9. The improved marine vehicle of claim 1 wherein a propulsor takes in water from a location proximal an upper surface of said first submerged supporting structure.

10. The improved marine vehicle of claim 9 wherein, during high speed forward operation in calm seas, at least twenty percent of the water taken into the propulsor is from a boundary layer adjacent the first submerged supporting structure.

11. The improved marine vehicle of claim 9 wherein, during high speed forward operation in calm seas, at least thirty percent of the water taken into the propulsor is from a boundary layer adjacent the first submerged supporting structure.

12. The improved marine vehicle of claim 9 wherein, during high speed forward operation in calm seas, at least forty percent of the water taken into the propulsor is from a boundary layer adjacent the first submerged supporting structure.

13. The improved marine vehicle of claim 9 wherein, during high speed forward operation in calm seas, at least fifty percent of the water taken into the propulsor is from a boundary layer adjacent the first submerged supporting structure.

14. The improved marine vehicle of claim 1 wherein a control surface is disposed proximal the first submerged supporting structure.

15. The improved marine vehicle of claim 14 wherein said control surface is a flap-like member.

16. The improved marine vehicle of claim 6 wherein the second submerged supporting structure is, at least in part, airfoil shaped.

17. The improved marine vehicle of claim 6 wherein one of said submerged supporting structures is, at least on average, disposed aft of and higher than the other submerged supporting structure.

18. The improved marine vehicle of claim 1 wherein at least one of said connecting strut members is, at least in its majority, airfoil shaped.

19. The improved marine vehicle of claim 1 wherein at least one of said connecting strut members includes a pressurized gas passageway that is in gaseous communication with the artificial gas pressurization means and the gas layer.

20. In an improved marine vehicle that has a hull member that is at least partially supported by a first submerged supporting structure, the improvement comprising:
   one or more connecting strut members in mechanical communication with the hull member and the first submerged supporting structure, said first submerged supporting structure at least in its majority submerged during high speed forward operation of the improved marine vehicle, and wherein a propulsor takes in water from a location proximal an upper surface of said first submerged supporting structure and wherein the first submerged supporting structure is, at least in part, airfoil shaped.

21. The improved marine vehicle of claim 20 wherein, during high speed forward operation in calm seas, at least twenty percent of the water taken into the propulsor is from a boundary layer adjacent the first submerged supporting structure.

22. The improved marine vehicle of claim 20 wherein, during high speed forward operation in calm seas, at least thirty percent of the water taken into the propulsor is from a boundary layer adjacent the first submerged supporting structure.

23. The improved marine vehicle of claim 20 wherein, during high speed forward operation in calm seas, at least forty percent of the water taken into the propulsor is from a boundary layer adjacent the first submerged supporting structure.

24. The improved marine vehicle of claim 20 wherein, during high speed forward operation in calm seas, at least fifty percent of the water taken into the propulsor is from a boundary layer adjacent the first submerged supporting structure.

25. The improved marine vehicle of claim 20 which further comprises means to supply gas from an artificial gas pressurization means to an underside of said first submerged supporting structure to thereby form a gas layer.

26. The improved marine vehicle of claim 25 wherein said gas layer, on average, rises going from forward to aft.

27. The improved marine vehicle of claim 25 wherein said gas layer is formed, at least in its majority, aft of a discontinuity in a lower surface of the first submerged supporting structure.

28. The improved marine vehicle of claim 25 wherein port and starboard portions of said gas layer are, at least in their majority, separated by structure.

29. The improved marine vehicle of claim 25 wherein said gas layer is restrained by a sidekeel of said first submerged supporting structure.

30. The improved marine vehicle of claim 20 which further comprises a second submerged supporting structure.

31. The improved marine vehicle of claim 20 wherein a forward outermost portion of said first submerged supporting structure is aft of a forward portion the horizontal centerline of said submerged supporting structure.

32. The improved marine vehicle of claim 20 wherein the first submerged supporting structure is comprised of port and starboard airfoil shapes that converge going inward toward each other.

33. The improved marine vehicle of claim 20 wherein a control surface is disposed proximal the first submerged supporting structure.

34. The improved marine vehicle of claim 33 wherein said control surface is a flap-like member.

35. The improved marine vehicle of claim 30 wherein the second submerged supporting structure is, at least in part, airfoil shaped.

36. The improved marine vehicle of claim 30 wherein one of said submerged supporting structures is, at least on average, disposed aft of and higher than the other submerged supporting structure.

37. The improved marine vehicle of claim 20 wherein at least one of the connecting strut members is, at least in its majority, airfoil shaped.

38. The improved marine vehicle of claim 20 wherein at least one of said connecting strut members includes a pressurized gas passageway that is in gaseous communication with the artificial gas pressurization means and the gas layer.

39. In an improved marine vehicle that has a hull member that is at least partially supported by first and second submerged supporting structures, the improvement comprising:
one or more connecting strut members in mechanical communication with the hull member and the first submerged supporting structure, one or more connecting strut members in mechanical communication with the hull member and the second submerged supporting structure, said first and second submerged supporting structures at least in their majority submerged during high speed forward operation of the improved marine vehicle, and means to supply gas from an artificial gas pressurization means to an underside of the first submerged supporting structure to thereby form a gas layer and wherein the first and the second submerged supporting structures are, at least in part, airfoil shaped.

40. The improved marine vehicle of claim 39 which further comprises means to supply gas from an artificial gas pressurization means to an underside of the second submerged supporting structure to thereby form a gas layer.

41. The improved marine vehicle of claim 39 wherein one of said submerged supporting structures is, at least on average, disposed aft of and higher than the other submerged supporting structure.

42. The improved marine vehicle of claim 39 wherein a propulsor takes in water from a location proximal an upper surface of said second submerged supporting structure.

43. In an improved marine vehicle that has a hull member that is at least partially supported by first and second submerged supporting structures, the improvement comprising:
one or more connecting strut members in mechanical communication with the hull member and the first submerged supporting structure, one or more connecting strut members in mechanical communication with the hull member and the second submerged supporting structure, said first and second submerged supporting structures at least in their majority submerged during high speed forward operation of the improved marine vehicle, and wherein a propulsor takes in water from a location proximal an upper surface of said second submerged supporting structure and wherein the first and second submerged supporting structures are, at least in part, airfoil shaped.

44. The improved marine vehicle of claim 43 wherein one of said submerged supporting structures is, at least on average, disposed aft of and higher than the other submerged supporting structure.

45. The improved marine vehicle of claim 43 which further comprises means to supply gas from an artificial gas pressurization means to an underside of one of said submerged supporting structures to thereby form a gas layer.

46. In an improved marine vehicle that has a hull member that is at least partially supported by first and second submerged supporting structures, the improvement comprising:
one or more connecting strut members in mechanical communication with the hull member and the first submerged supporting structure, one or more connecting strut members in mechanical communication with the hull member and the second submerged supporting structure, said first and second submerged supporting structures at least in their majority submerged during high speed forward operation of the improved marine vehicle, means to supply gas from an artificial gas pressurization means to an underside of one of said submerged supporting structures to thereby form a gas layer, and wherein a propulsor takes in water from a location proximal an upper surface of one of said submerged supporting structures and wherein the first and second submerged supporting structures are, at least in part, airfoil shaped.

47. The improved marine vehicle of claim 46 wherein the first and second submerged supporting structures are comprised of port and starboard airfoil shapes that converge going inward toward each other.

48. The improved marine vehicle of claim 46 wherein, during high speed forward operation in calm seas, at least twenty percent of the water taken into the propulsor is from a boundary layer adjacent its submerged supporting structure.

49. The improved marine vehicle of claim 46 wherein a control surface is disposed proximal the first submerged supporting structure.

50. The improved marine vehicle of claim 49 wherein said control surface is a flap-like member.

* * * * *